(12) United States Patent
Tomino

(10) Patent No.: US 9,133,368 B2
(45) Date of Patent: Sep. 15, 2015

(54) ADHESIVE SHEET

(75) Inventor: Chisato Tomino, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 14/240,898

(22) PCT Filed: Sep. 6, 2011

(86) PCT No.: PCT/JP2011/070685
§ 371 (c)(1),
(2), (4) Date: Feb. 25, 2014

(87) PCT Pub. No.: WO2013/031032
PCT Pub. Date: Mar. 7, 2013

(65) Prior Publication Data
US 2014/0205819 A1    Jul. 24, 2014

(30) Foreign Application Priority Data
Aug. 31, 2011 (JP) ................ 2011-188477

(51) Int. Cl.
| | | |
|---|---|---|
| *B32B 3/00* | (2006.01) | |
| *C09J 7/02* | (2006.01) | |
| *C08G 18/79* | (2006.01) | |
| *C08G 18/44* | (2006.01) | |
| *C09J 175/04* | (2006.01) | |

(52) U.S. Cl.
CPC ............. *C09J 7/0264* (2013.01); *C08G 18/44* (2013.01); *C08G 18/792* (2013.01); *C09J 7/0207* (2013.01); *C09J 7/0296* (2013.01); *C09J 175/04* (2013.01); *B32B 2405/00* (2013.01); *C08G 2150/60* (2013.01); *C09J 2201/606* (2013.01); *C09J 2201/622* (2013.01); *C09J 2400/243* (2013.01); *C09J 2475/006* (2013.01); *Y10T 428/24802* (2015.01); *Y10T 428/24851* (2015.01); *Y10T 428/249955* (2015.04); *Y10T 428/249983* (2015.04)

(58) Field of Classification Search
CPC ............. Y10T 428/24851; Y10T 428/249955
See application file for complete search history.

(56) References Cited

U.S. PATENT DOCUMENTS

2010/0092730 A1* 4/2010 Tomino et al. ............... 428/161
2010/0233462 A1   9/2010 Hishizawa

FOREIGN PATENT DOCUMENTS

| CN | 101143997 A | 3/2008 |
|---|---|---|
| CN | 101679815 A | 3/2010 |
| JP | 57-201573 A | 12/1982 |
| JP | 59-090980 A | 6/1984 |
| JP | 02-003481 A | 1/1990 |
| JP | 02-017773 A | 2/1990 |
| JP | 08-003521 A | 1/1996 |
| JP | 10-279900 A | 10/1998 |
| JP | 10-310754 A | 11/1998 |
| JP | 2001-335766 A | 12/2001 |
| JP | 2001-354745 A | 12/2001 |
| JP | 2004-359744 A | 12/2004 |

OTHER PUBLICATIONS

International Search Report for international application No. PCT/JP2011/070685.
English Translation of JIS P8119.
Office Action and English translation for Chinese Application No. 201180073067.2 mailed Nov. 3, 2014.
Office Action and English translation for Japanese Application No. 2013-530995 mailed Dec. 2, 2014.

* cited by examiner

*Primary Examiner* — Elizabeth Mulvaney
(74) *Attorney, Agent, or Firm* — Christopher Casieri

(57) ABSTRACT

The present invention relates to an adhesive sheet including a substrate sheet and an adhesive layer, wherein the substrate sheet has a void containing layer capable of the air permeability from the surface contacting with the adhesive layer, the air permeability measured by specific test method is $1 \times 10^3$ to $3 \times 10^5$ seconds. The present invention can provide an adhesive sheet which is capable of efficiently preventing the occurrence of the swelling or the floating (that is the occurrence of a blister) even if the time passes when adhered to the surface of the various plastic moldings. In addition, the present invention can provide the adhesive sheet capable of exhibiting excellent blister resistance to any adhesive agent.

11 Claims, No Drawings

ADHESIVE SHEET

This application is a 371 of international application No. PCT/JP2011/070685, filed Sep. 6, 2011, which, in turn, claims priority of Japanese Patent Application No.:2010-188477, filed on Aug. 31, 2011.

TECHNICAL FIELD

The present invention relates to an adhesive sheet. In more detail, the present invention relates to an adhesive sheet having blister resistance which is capable of preventing a blister, such as swelling and floating, when the adhesive sheet is adhered to the surface of a various kinds of plastic molding.

BACKGROUND ART

Generally, an adhesive sheet obtained by applying a pressure-sensitive adhesive agent to a substrate has been used in various fields because an adhesive sheet can easily adhere to an adherend by being pressed. In recent year, plastic molding has been widely used for many reasons, such as reducing the weight of products. As a result, the use of an adhesive sheet which adheres to a plastic molding has increased. Examples of a plastic molding include a product obtained by molding a resin such as polycarbonate, polymethyl methacrylate, polystyrene or an ABS resin. When an adhesive sheet (for example, an adhesive label) including a substrate which has a gas-barrier property was adhered to a surface of these plastic moldings for the purpose of decoration and the like, the gas is generated from the plastic molding and the bubbles are formed between the adhesive sheet and plastic molding. As a result, swelling or floating, that is a blister, is likely to be generated. When such a blister occurs, the appearance of a label is impaired. As a result, the decorative property of the adhesive sheet decreases remarkably.

In order to solve this problem, for example, Patent Document 1 discloses an acrylic adhesive composition in which the copolymer obtained by radical polymerization of methacrylic acid ester and a compound which has a carboxyl group capable of a copolymerization and a tertiary amine which has a vinyl group is included.

In addition, Patent Document 2 proposes an adhesive sheet having a blister resistance in which a copolymer consisting of an acrylic acid ester including alkyl group having 4 to 12 carbon atoms and 0.1 to 10 wt % of a polar monomer such as acrylic acid or 2-hydroxyethyl acrylate and an aziridine-based cross-linking agent are added.

Further, Patent Document 3 discloses an adhesive sheet including an adhesive component and a hardening component which is an acrylic monomer or oligomer as a constituent of an adhesive layer. However, the hardening component causes a reduction of the flocculation capacity of the adhesive layer. Further, when the compatibility with the adhesive component is not good, the adhesive layer might become cloudy.

Patent Document 4 discloses an adhesive composition in which a resin composition (1) having a specific molecular weight which was obtained by copolymerization of a methacrylic acid alkyl ester having 1 to 12 carbon atoms with a unsaturated monomer including carboxyl group and one or two or more monomer selected from a methacrylic acid alkyl ester having 1 to 20 carbon atoms, a methacrylic acid cycloalkyl ester, a benzyl-methacrylic acid or styrene and a resin composition having a specific Tg and molecular weight which was obtained by copolymerization of a unsaturated monomer including an amino group are added.

Further, Patent Document 5 discloses an adhesive composition having a blister resistance in which a copolymer having a specific molecular weight which was obtained by copolymerization of an unsaturated monomer including carboxyl group with an unsaturated monomer including amino group by as a main component of an acrylic acid ester including alkyl group having 1 to 12 carbon atoms, and a cross linking agent having glycidyl group are added.

Patent Document 6 discloses a resin composition having a molecular weight of 1,500,000 or more and the weight average molecular weight/the number average molecular weight of 4.0 or less.

DOCUMENTS OF RELATED ART

Patent Documents

[Patent Document 1] Japanese Unexamined Patent Application, First Publication No. 02-003481.
[Patent Document 2] Japanese Unexamined Patent Application, First Publication No. 08-003521.
[Patent Document 3] Japanese Unexamined Patent Application, First Publication No. 10-279900.
[Patent Document 4] Japanese Unexamined Patent Application, First Publication No. 10-310754.
[Patent Document 5] Japanese Unexamined Patent Application, First Publication No. 2001-335766.
[Patent Document 6] Japanese Unexamined Patent Application, First Publication No. 2001-354745.

DISCLOSURE OF THE INVENTION

Problems to be Solved by the Invention

However, prior arts described in Patent Documents 1 to 6 had problems that achieving the adhesive property and a blister resistant at the same time for use in the label is difficult because these arts are restricted to the composition of the adhesive agent, the type of the cross-linking agent or the molecular weight.

The present inventions have been performed under such situation, an object of the present invention is to provide an adhesive sheet capable of efficiently preventing the occurrence of the swelling or the floating (that is a blister) even if the time passes when adhered to the surface of the various plastic moldings. In addition, an object of the present invention is to provide the adhesive sheet capable of exhibiting excellent blister resistance to any adhesive agent.

Means for Solving the Problems

As a result of a keen examination to solve the above problem, the inventor has obtained the following knowledge.
The inventor has found that, in the adhesive sheet including a substrate sheet and an adhesive layer, if a void containing layer capable of the air permeability from the surface contacted with the adhesive layer was provided on the substrate sheet, and if the air permeability was within the specific range, the adhesive sheet can efficiently prevent the occurrence of a blister irrespective of the type of the adhesive agent. Further, the air permeability of the substrate sheet can be accurately measured by applying the method of "Paper and board-Determination of smoothness by Bekk method" described in JIS P 8119.
The present invention has been completed on the basis of the above knowledge.

The present invention is directed to,

[1] An adhesive sheet including a substrate sheet and an adhesive layer, wherein the substrate sheet has a void containing layer capable of the air permeability from the surface contacting with the adhesive layer, the air permeability measured by the following test method is $1 \times 10^3$ to $3 \times 10^5$ seconds, <Test Method>

An adhesive-coated PET film having a hole with a diameter of 6 mm (manufactured by Sumitomo 3M Limited, "Polyester Tape 850") is adhered to the surface of the adhesive layer of the adhesive sheet and ten-test sheets are prepared by cutting the adhesive sheet into sheets of 20 mm×20 mm. Each test sheet measures the number of seconds until the pressure in the big vacuum container changes from 50.7 kPa to 48.0 kPa, according to 9-a) in JIS P 8119, by using Bekk smoothness defined in JIS P 8119 and overlapping the hole of the test sheet on the circular hole of the Bekk smoothness. The number of seconds of the average value is determined as the air permeability of the substrate sheet.

[2] The adhesive sheet according to [1], the air permeability from the surface of the substrate sheet which is opposite to the side contacted with the adhesive layer is $5 \times 10^5$ seconds or more,

[3] The adhesive sheet according to [1] or [2], wherein at least one selected from a printed character and a print is applied to the surface of the substrate sheet which is opposite to the side contacted with the adhesive layer,

[4] The adhesive sheet according to [3], wherein a laminated material is laminated on the surface of the printed character or the print, and

[5] The adhesive sheet according to anyone of [1] to [4], wherein the adhesive sheet has blister-resistance.

Effects of the Invention

The present invention can provide an adhesive sheet which is capable of efficiently preventing the occurrence of the swelling or the floating (that is the occurrence of a blister) even if the time passes when adhered to the surface of the various plastic moldings.

EMBODIMENTS OF THE INVENTION

The adhesive sheet of the present invention is the adhesive sheet including a substrate sheet and an adhesive layer, wherein the substrate sheet has a void containing layer capable of the air permeability from the surface contacted with the adhesive layer, the air permeability measured by the following test method is $1 \times 10^3$ to $3 \times 10^5$ seconds.

[Substrate Sheet]

In the adhesive sheet of the present invention, the substrate sheet has the void containing layer capable of the air permeability from the surface contacted with the adhesive layer, the air permeability is $1 \times 10^3$ to $3 \times 10^5$ seconds. If the air permeability is in this range, the gas generated from the plastic molding can be eliminated from the boundary face of the substrate sheet, through the void containing layer. As a result, blister can be prevented.

There is no particular limitation as a material for forming the base sheet, and the suitable material can be selected from the plastic film used as a support material of the adhesive sheet. Examples of the material include polyesters such as polyethylene terephthalate, polybutylene terephthalate, and polyethylene naphthalate, polyethylene, polypropylene, polyvinyl chloride, polyvinylidene chloride, polyurethane, polyvinyl alcohol, ethylene-vinyl acetate copolymer, polystyrene, polycarbonate, polymethylpentene, polysulfone, polyether ether ketone, polyether sulfone, polyphenylene sulfide, polyetherimide, polyimide, a fluorocarbon resin, polyamide, an acrylic resin, a norbornene resin, a cyclo-olefin resin or the like.

In these materials, polyethylene terephthalate or polypropylene and the like is mainly used. In addition, polyethylene naphthalate having high glass-transition point (Tg) can be used in areas requiring heat resistance The method of providing the void containing layer on the substrate sheet consisting of the above material is not particularly limited. Examples of conventional known methods include (1) the method of performing the stretching treatment on the material after blending the organic particles and/or inorganic particles in the material and forming a film, (2) the method of volatilizing the liquid by heating after dispersing the liquid incompatible with the material, (3) the method of foaming the material by heating after dispersing the foaming agent to the material. The method of (1) can adjust the size of the pores and the density by controlling the amount and particle size of organic particles and/or inorganic particles. The method of (2) can adjust the size of the pores and density by controlling the amount and type of liquid incompatible with the material. The method of (3) can adjust the size of the pores and density by controlling the amount and type of the foaming agent.

In addition, a commercially film, such as "Aqua YUPO (LAR75)", manufactured by Yupo Corporation, can also be used.

A laminated film obtained by laminating a film having a void containing layer capable of the air permeability from the surface contacting with the adhesive layer and a film having no void containing layer on the other side of contacting with the adhesive layer may use as the substrate sheet. Furthermore, the void containing layer may be provided on the film having no void containing layer by the above methods of (1) to (3).

<Test Method of the Air Permeability Measurement>

The adhesive-coated PET film having a hole with a diameter of 6 mm (manufactured by Sumitomo 3M Limited, "Polyester Tape 850") is adhered to the surface of the adhesive layer of the adhesive sheet and ten-test sheets are prepared by cutting the adhesive sheet into sheets of 20 mm×20 mm. Each test sheet measures the number of seconds until the pressure in the big vacuum container changes from 50.7 kPa to 48.0 kPa, according to 9-a) in JIS P 8119, by using Bekk smoothness defined in JIS P 8119 and overlapping the hole of the test sheet on the circular hole of the Bekk smoothness. The average number of seconds is determined to be the air permeability of the substrate sheet.

<Test Method of the Air Permeability Measurement from The Surface of the Substrate Sheet which is Opposite to the Side Contacted with the Adhesive Layer>

In the test method of the air permeability measurement, the air permeability from the surface of the substrate sheet which is opposite to the side contacted with the adhesive layer is represented as the number of seconds which was measured at the same test method of the above air permeability measurement, except that the substrate sheet of the adhesive sheet was adhered to the adhesive surface of the adhesive-coated PET film.

The reason for creating the hole with a diameter of 6 mm is in order to measure the amount of air passing through the adhesive sheet. In addition, the reason for adhering the test sheet to the adhesive-coated PET film is in order to maintain a constant surface roughness of each test sheet.

According to the adhesive sheet of the present invention, the air permeability measured by the above test method is $1 \times 10^3$ to $3 \times 10^5$ seconds. If the air permeability is less than $1 \times 10^3$ seconds, the mechanical strength of the substrate sheet is not sufficient. On the other hands, if the air permeability is over $3 \times 10^5$ seconds, blister resistance of the obtained adhesive sheet is not sufficient. From the viewpoint of this, the air permeability of the substrate sheet is preferably from $8.5 \times 10^4$ to $13 \times 10^4$ seconds, and is more preferably from $9 \times 10^4$ to $12.5 \times 10^4$ seconds.

[Adhesive Layer]

According to the adhesive sheet of the present invention, since the adhesive layer is not required to have blister resistance, there is no particular limitation as an adhesive agent for forming the adhesive sheet and various types of adhesive agent such as a rubber based adhesive agent, a silicone-based adhesive agent, or an acrylic adhesive agent, can be used. From the viewpoint of the performance as an adhesive agent and of weather resistance, the acrylic adhesive agent is preferable. Further, the adhesive agent may be either a solvent-type adhesive agent or an emulsion-type adhesive agent. From the viewpoint of the environmental, the emulsion-type adhesive agent is preferable. In the emulsion-type adhesive agent, it may contain a crosslinking agent as required.

According to the adhesive sheet of the present invention, the thickness of the adhesive layer is preferably from 5 to 50 µm, and more preferably from 10 to 30 µm.

According to the adhesive sheet of the present invention, at least one selected from a printed character and a print can be applied to the surface of the substrate sheet which is opposite to the side contacted with the adhesive layer, as required as an adhesive label application.

In this case, in order to impart a print durability and a printability, a coating layer for the print (an ink receiving layer) may be provided on said opposite surface. The type of coating material for print to be used to form the coating layer for print is not particularly limited, and a polyester resin, an acrylic resin, or a polyurethane resin and the like is used. These coating materials may be used alone or a combination of two or more may be used. Further, the coating material including these resins may be either a non-solvent type coating material or a solvent-type coating material. The method of forming the coating layer for print by coating the above coating material and drying is not particular limited, and it is possible to use a conventionally known method, for example, a method of coating using a gravure, a mayer bar, an air knife, or a die coater and the like and then dried. There is no particular limitation on the thickness of the coating layer for print, but it is usually about 0.01 to 10 µm, and is preferably 0.05 to 5 µm.

As the printing method, for example, it is possible to include offset, letterpress (relief), gravure, flexo, screen, and inkjet methods. If the offset, letter press (letterpress), gravure, flexo, or screen method is used, the air permeability of the surface of the substrate sheet which is opposite to the side contacted with the adhesive layer is preferably $5 \times 10^5$ seconds or more, from the viewpoint of printability (surface smoothness). If the air permeability is less than $5 \times 10^5$ seconds, smoothness is insufficient and a printing omission is likely to occur. If at least one selected from a printed character and a print was applied to the above surface of the substrate sheet, it may be laminated using a laminated material composed of a transparent adhesive sheet for the protection of these. There is no particular limitation on the type of film of the laminated material and the type of the adhesive agent. The adhesive sheet of the present invention obtained in this manner can be adhered to the plastic molding such as polycarbonate, polymethyl methacrylate, polystyrene, and an ABS resin, and effectively suppress the occurrence of blisters.

(Releasing Sheet)

According to the adhesive sheet of the present invention, a releasing sheet may be adhered to the surface of the adhesive layer which is opposite to the side contacted with the substrate sheet as required. The releasing sheet may be used the material which is performed the releasing treatment on the bonding surface of the adhesive layer as required and includes the substrate consisting of a film made of various resins such as polyethylene terephthalate, polybutylene terephthalate, polyethylene, polypropylene and polyacrylate, or various paper materials such as polyethylene laminated paper, polypropylene laminated paper, clay coated paper, resin coated paper, glassine paper, and wood free paper.

Examples of the releasing treatment include the method of forming the release agent layer consisting of release agent such as a silicone resin, long-chain alkyl resins, fluorine-based resins. The thickness of the release sheet is not particularly limited and may be suitably selected.

[The Method of Producing the Adhesive Sheet]

The adhesive sheet of the present invention can be prepared by the following method.

The adhesive layer is formed on the release-treated surface of the releasing sheet described above by coating the adhesive agent, preferably an acrylic adhesive agent, more preferably emulsion type acrylic adhesive agent by the conventional known method, as the thickness after drying is preferably 5 to 50 µm, and more preferably 10 to 30 µm.

Further, the adhesive layer having a releasing sheet and the substrate sheet having the void containing layer capable of the air permeability from the surface contacting with the adhesive layer are adhered using a laminate roller.

The method of applying the adhesive agent, for example, an air knife coater, a blade coater, a bar coater, a gravure coater, a roll coater, a roll knife coater, a curtain coater, a die coater, a knife coater, a screen coater, a Mayer bar coater and a kiss coater can be used.

EXAMPLES

Although the following indicates examples of the present invention, the present invention is not limited to the following examples.

Each property of the adhesive sheet obtained by each example was measured according to the following method.

(1) Test method of the air permeability measurement of the surface of the substrate sheet and the surface of the substrate sheet which is opposite to the side contacted with the adhesive layer of the substrate sheet.

With regard to each adhesive sheets obtained by Examples and Comparative Examples, the air permeability of the substrate sheet and the surface of the substrate sheet which is opposite to the side contacted with the adhesive layer were measured, according to the test method of the air permeability measurements described in the specification.

The trade name "Model DB-2", manufactured by Toyo Seiki Seisaku-Sho, Ltd. was used as the smoothness tester. The measurement of the surface of the substrate sheet which is opposite to the side contacted with the adhesive layer of Example 4 and 5 were performed before laminating the laminated material.

(2) A Blister-Resistant Test

The adhesive sheet obtained by Examples and Comparative examples was cut into 50 mm×50 mm sheets and the releasing sheet was released. Then, the adhesive sheet was adhered to the polymethylmethacrylate (PMMA) plate and the polycarbonate (PC) plate which are the adherend using a squeegee. After standing for 30 minutes, the occurrence of blisters after heating acceleration by standing for 1 hour in a hot air dryer at 90° C. was observed, and was evaluated according to the following criteria thereafter.

A: The occurrence blister was not observed.

B: The occurrence blister was observed in among the adhesion area of the adhesive sheet of 1% or more to less than 10%.

C: The occurrence blister was observed in among the adhesion area of the adhesive sheet of 10% or more.

(3) Printing Test

The printing layer was formed on the back surface of the adhesive sheet obtained in Examples and Comparative Examples by printing the ultraviolet-curable ink (trade name "BEST CURE-UV 161Black", manufactured by T&K TOKA COMPANY) at a thickness of 1.5 μm and then irradiated with UV light for about 1 second using a mercury lamp (2light, 3 kV).

After producing 10 pieces of adhesive sheet which were formed of the printing layer in each example, the appearance was observed visually and the presence or absence of printing omission was confirmed, and was evaluated according to the following criteria thereafter.

A: the printing omission was not observed in all sheets.

B: the printing omission was observed in 1 to 3 sheets.

C: the printing omission was observed in 4 or more sheets.

In addition, Example 4 and 5 printing was performed before laminating the laminated material.

Example 1

The polypropylene synthetic paper film having a thickness of 80 μm (trade name "YUPO SGP80", manufactured by YUPO CORPORATION) was used as (A) layer. Further, 100 parts by mass of polycarbonate-based urethane resin (trade name "Resamine 8820", manufactured by Dainichiseika Color & Chemicals Mfg. Co., Ltd.) and 6 parts by mass of the foaming agent (trade name "FE-788", manufactured by Eiwa Chemical Industry Co., Ltd., particle size: about 10 μm) were mixed and formed the coating agent (20° C. viscosity: 4000 mPa·s) for (B) layer which is on top of (A) layer. The substrate sheet consisting of (A) layer and (B) layer was obtained by forming a void containing layer capable of the air permeability from the surface formed by coating the coating agent on (A) layer by using a knife coater as the thickness after drying is 50 μm and drying at 130° C. for 2 minutes. The adhesive layer having the thickness of 20 μm was formed by applying the acryl emulsion adhesive agent (trade name "BPW6111", manufactured by TOYOCHEM CO., LTD.) on (B) layer and then drying. After that, by covering the surface of the adhesive sheet at the releasing sheet (trade name "SP-8K blue", manufactured by Lintec Corporation), the adhesive sheet was obtained. Each property of the adhesive sheet was evaluated. The results are summarized in Table 1.

Example 2

The adhesive sheet was obtained by the same manner as Example 1 with the exception changing the adhesive agent to the mixture that is obtained by mixing 100 parts by mass (solid content) of the adhesive agent (trade name "SK-Dyne701", manufactured by Soken Chemical & Engineering Co. Ltd.) and 0.5 parts by mass of the isocyanate crosslinking agent (trade name "CORONATE L", manufactured by Nippon Polyurethane Industry Co., Ltd) and (B) layer of the substrate sheet was formed by using of it. Each property of the adhesive sheet was evaluated. The results are summarized in Table 1.

Example 3

The adhesive sheet was obtained by the same manner as Example 1, except that the polypropylene synthetic paper (trade name "Aqua YUPO (LAR75)", manufactured by Yupo Corporation) having the thickness of 75 μm and the void containing layer which is capable of the air permeability was adhered to the surface contacting with the adhesive layer. Each property of the adhesive sheet was evaluated. The results are summarized in Table 1.

Example 4

The adhesive sheet was obtained by laminating the adhesive sheet including the transparent polypropylene film (trade name "PP20 PA-T1", manufactured by Lintec Corporation), which is the laminating material, on the back surface of the substrate sheet of the adhesive sheet obtained in Example 3. Each property of the adhesive sheet was evaluated. The results are summarized in Table 1.

Example 5

The adhesive sheet was obtained by laminating the adhesive sheet including the transparent PET film (trade name "PET25 PL THIN", manufactured by Lintec Corporation), which is the laminating material, on the back surface of the substrate sheet of the adhesive sheet obtained in Example 3. Each property of the adhesive sheet was evaluated. The results are summarized in Table 1.

Example 6

The layered product consisting of the substrate sheet, the adhesive layer, and the releasing sheet was obtained by same manner in Example 1, except that the polycarbonate film (trade name "LEXAN", manufactured by Asahi Glass Co., Ltd.) having the thickness of 100 μm was used as (A) layer of the substrate sheet. After that, by laminating the laminate material (trade name "PP20 PA-T1", manufactured by Lintec Corporation) on the substrate sheet of the layered product, the adhesive sheet was obtained. Each property of the adhesive sheet was evaluated. The results are summarized in Table 1.

Comparative Example 1

The adhesive sheet was obtained by the same manner as Example 1, except that the substrate sheet was changed to the transparent PET film (trade name "Lumirror", manufactured by Toray Industries Inc.) having the thickness 25 μm. Each property of the adhesive sheet was evaluated. The results are summarized in Table 1.

Comparative Example 2

The adhesive sheet was obtained by the same manner as Example 1, except that the polypropylene synthetic paper (trade name "SGP80", manufactured by Yupo Corporation) was used. Each property of the adhesive sheet was evaluated. The results are summarized in Table 1.

Comparative Example 3

The adhesive sheet was obtained by the same manner as Example 1, except that the substrate sheet consisting of (B) layer was used. Each property of the adhesive sheet was evaluated. The results are summarized in Table 1.

TABLE 1

| | The air permeability of the surface of the substrate sheet contacting with the adhesive layer (seconds) | The air permeability of the surface of the substrate sheet which is opposite to the side contacted with the adhesive layer (seconds) | Blister resistance test | | Printing test |
|---|---|---|---|---|---|
| | | | PMMA | PC | |
| Example 1 | $9 \times 10^4$ | $>8 \times 10^5$ | A | A | A |
| Example 2 | $9 \times 10^4$ | $>8 \times 10^5$ | A | A | A |
| Example 3 | $11.42 \times 10^4$ | $>8 \times 10^5$ | A | A | A |
| Example 4 | $12.5 \times 10^4$ | $>8 \times 10^5$ | A | A | A |
| Example 5 | $12.45 \times 10^4$ | $>8 \times 10^5$ | A | A | A |
| Example 6 | $9.15 \times 10^4$ | $>8 \times 10^5$ | A | A | A |
| Comparative Example 1 | $>8 \times 10^5$ | $>8 \times 10^5$ | C | C | A |
| Comparative Example 2 | $>8 \times 10^5$ | $>8 \times 10^5$ | C | C | A |
| Comparative Example 3 | $5 \times 10^4$ | $4 \times 10^4$ | A | A | C |

INDUSTRIAL APPLICABILITY

The present invention can provide an adhesive sheet capable of efficiently preventing the occurrence of the swelling or the floating (that is a blister) even if the time passes when adhered to the surface of the various plastic moldings. In addition, the present invention can provide the adhesive sheet capable of exhibiting excellent blister resistance to any adhesive agent.

The invention claimed is:

1. An adhesive sheet comprising a substrate sheet and an adhesive layer,
    wherein the substrate sheet has a void containing layer that is formed on a surface contacting the adhesive layer,
    and the void containing layer is capable of air permeability from the surface contacting with the adhesive layer,
    and the air permeability is measured as smoothness, and wherein the smoothness is $1 \times 10^3$ to $3 \times 10^5$ seconds.

2. The adhesive sheet according to claim 1, wherein the smoothness of the surface of the substrate sheet which is opposite to the side contacted with the adhesive layer is $5 \times 10^5$ seconds or more.

3. The adhesive sheet according to claim 1,
    wherein at least one selected from a printed character and a print is applied to the surface of the substrate sheet which is opposite to the side contacted with the adhesive layer.

4. The adhesive sheet according to claim 3,
    wherein a laminated material is laminated on the surface of one of the printed character and the print.

5. The adhesive sheet according to any one of claim 1, wherein the adhesive sheet has blister-resistance.

6. The adhesive sheet according to claim 2,
    wherein at least one selected from a printed character and a print is applied to the surface of the substrate sheet which is opposite to the side contacted with the adhesive layer.

7. The adhesive sheet according to claim 2, wherein the adhesive sheet has blister-resistance.

8. The adhesive sheet according to claim 3, wherein the adhesive sheet has blister-resistance.

9. The adhesive sheet according to claim 4, wherein the adhesive sheet has blister-resistance.

10. The adhesive sheet according to claim 1, wherein the substrate sheet is a plastic film which includes the void-containing layer formed on a surface thereof.

11. The adhesive sheet according to claim 1, wherein the void-containing layer is formed on the surface of the substrate sheet by at least one method selected from the group consisting of the following:
    (1) a method of performing a stretching treatment on a material after blending at least one of organic particles and inorganic particles in the material and forming a film,
    (2) a method of volatilizing a liquid by heating after dispersing the liquid incompatible with a material, and
    (3) a method of foaming a material by heating after dispersing a foaming agent into the material.

* * * * *